United States Patent
Filippin et al.

(10) Patent No.: US 9,835,243 B2
(45) Date of Patent: Dec. 5, 2017

(54) HYDRAULIC CIRCUIT FOR THE TRANSMISSIONS OF INDUSTRIAL AND AGRICULTURAL VEHICLES

(71) Applicant: CARRARO DRIVE TECH S.P.A., Campodarsego (PD) (IT)

(72) Inventors: Stefano Filippin, Caltana di S. Maria di Sala (IT); Stefano Facchin, Vigodarzere (IT); Enrico Mangiaracina, Padua (IT)

(73) Assignee: CARRARO DRIVE TECH S.P.A., Campodarsego (PD) (IT)

( * ) Notice: Subject to any disclaimer, the term of this patent is extended or adjusted under 35 U.S.C. 154(b) by 0 days.

(21) Appl. No.: 14/786,026

(22) PCT Filed: Apr. 24, 2014

(86) PCT No.: PCT/EP2014/058404
§ 371 (c)(1),
(2) Date: Oct. 21, 2015

(87) PCT Pub. No.: WO2014/174050
PCT Pub. Date: Oct. 30, 2014

(65) Prior Publication Data
US 2016/0069447 A1    Mar. 10, 2016

(30) Foreign Application Priority Data

Apr. 24, 2013    (IT) ................ PD2013A0112

(51) Int. Cl.
*F16H 57/04*    (2010.01)
*F16H 61/00*    (2006.01)
(Continued)

(52) U.S. Cl.
CPC ......... *F16H 57/0446* (2013.01); *F15B 13/02* (2013.01); *F15B 15/08* (2013.01);
(Continued)

(58) Field of Classification Search
CPC ... B60K 3/00; B60K 3/02; F01B 13/02; F01B 17/02; F01D 1/026; Y02T 50/671;
(Continued)

(56) References Cited

U.S. PATENT DOCUMENTS 8,528,684 B2 *  9/2013  Laws ................ E02F 3/964
                                              180/321
8,544,263 B2 * 10/2013  Kim ................. G05B 19/409
                                              60/403

(Continued)

OTHER PUBLICATIONS

International Search Report issued by the European Patent Office dated Jul. 2, 2014, for International Application No. PCT/EP2014/058404 filed Apr. 24, 2014.

*Primary Examiner* — Logan Kraft
(74) *Attorney, Agent, or Firm* — Stradley Ronon Stevens & Young, LLP (57) ABSTRACT

A hydraulic circuit for the transmissions of industrial and agricultural vehicles. The circuit comprises a feed pump driven by an internal combustion engine; a lubricating circuit; a main pressure regulator capable of bringing about a first change in the pressure of the working fluid in the circuit, this change in pressure being capable of regulation in relation to a first regulation pressure; a maximum pressure regulator for the lubrication circuit capable of bringing about a second change in pressure of the working fluid depending upon a second regulating pressure; and means for regulating regulation of the first and second regulating pressures.

17 Claims, 6 Drawing Sheets

(51) Int. Cl.
 *F15B 13/02* (2006.01)
 *F15B 15/08* (2006.01)

(52) U.S. Cl.
 CPC ..... *F16H 57/0435* (2013.01); *F16H 61/0021* (2013.01); *F16H 61/0025* (2013.01); *F15B 2211/50536* (2013.01); *F15B 2211/555* (2013.01); *F15B 2211/56* (2013.01); *F15B 2211/565* (2013.01); *F15B 2211/88* (2013.01); *F16H 2061/0037* (2013.01)

(58) Field of Classification Search
 CPC ............ F16H 57/0435; F16H 57/0446; F16H 61/0021; F16H 61/0025; F16H 61/0037; F15B 13/02; F15B 15/08; F15B 2211/50536; F15B 2211/555; F15B 2211/56; F15B 2211/565; F15B 2211/88
 See application file for complete search history.

(56) References Cited

U.S. PATENT DOCUMENTS

| | | |
|---|---|---|
| 2004/0211174 A1 | 10/2004 | Ohtsuki |
| 2005/0143224 A1 | 6/2005 | Aoki et al. |
| 2011/0272239 A1 | 11/2011 | Yoshikawa et al. |
| 2012/0096843 A1 | 4/2012 | Hennemann et al. |

\* cited by examiner

HYDRAULIC CIRCUIT FOR THE TRANSMISSIONS OF INDUSTRIAL AND AGRICULTURAL VEHICLES

RELATED APPLICATIONS

The present application is a U.S. national phase application of International Application No. PCT/EP2014/058404 filed on Apr. 24, 2014, which claims the benefit of priority to Italian Patent Application Number PD2013A000112, filed on Apr. 24, 2014, the contents of which are incorporated in this application by reference.

TECHNICAL FIELD

This invention relates to a hydraulic circuit for the transmissions of industrial and agricultural vehicles of the type comprising an internal combustion engine connected to a transmission provided with a feed pump for the hydraulic circuit and an output shaft driven by the internal combustion engine which is capable of providing useful power to drive other working components.

BACKGROUND OF THE INVENTION

Typically earthmoving machines, such as for example backhoe loaders and excavators, but in general many vehicles for industrial and agricultural use, use a transmission to provide the motive power required to move them.

The hydraulic circuits used in these transmissions typically comprise a pump to raise the oil to the working pressure and deliver it to a lubrication circuit and the vehicle transmission components. The pump is driven by an internal combustion engine which is caused to work at variable speeds and powers depending upon the pressure/power required to move the vehicle.

The oil pressure in the hydraulic circuit is however maintained above a lower limit value because a certain throughput is required in order to lubricate the transmission even when the vehicle is stopped. In this type of vehicle provision is also made for a so-called power take-off, that is to say an output shaft, also known as a PTO shaft, coupled to the internal combustion engine, which drives the vehicle's auxiliary pump and which is used to transmit power from the internal combustion engine to the moving arm of the excavator, in the case of an earthmoving machine, or in general to other working components.

For example, again in the case of vehicles of this type, the power take-off is connected to the pump of another hydraulic circuit which brings about movement of the arm and other tools.

In general, two different working situations for the vehicle can be envisaged—a first situation in which the vehicle is moving and power may be requested for the vehicle's hydraulic system, and a second situation in which the power to the vehicle's hydraulic circuit is provided when it is stopped. In the first case power has to be provided to both the hydraulic circuits, while in the second case the working components have to be fed and only the minimum hydraulic flow for lubrication is provided to the transmission.

However in the latter case both the power provided to the working components and the pressure provided to the transmission depend on the rotation speed of the internal combustion engine and therefore in known vehicles it is not possible to provide high power to the working components and limit the pressure to the hydraulic circuit of the transmission to the minimum values necessary to ensure adequate lubrication at the same time.

In fact, in the example of a backhoe loader or an excavator, the transmission is not required to operate when it is engaged purely in excavation work with the vehicle stopped.

However the internal combustion engine is nevertheless made to work at a high rotation speed to deliver power to the hydraulic circuit of the working components, the pump for this circuit being driven by the power take-off shaft.

In this way, when purely excavation work is being carried out the hydraulic system of the transmission is also inevitably maintained at a high pressure, even though this is not required.

As the pump controlling the transmission has a fixed cylinder capacity there will be an expenditure of power to maintain pressure in the transmission's hydraulic system which will depend on the throughput delivered by the pump and the main pressure in the hydraulic circuit of the transmission.

This gives rise to consumption of power P from the internal combustion engine which is dissipated without being utilized, with a consequent inefficiency for the vehicle.

This is even more true when it is borne in mind that these vehicles are mainly used for purely excavation work during their lives.

It will therefore be desirable to avoid such energy wastage.

The technical problem which underlies this invention is therefore that of providing an industrial vehicle which makes it possible to overcome the abovementioned disadvantages with reference to the known art.

SUMMARY OF THE INVENTION

This problem is resolved by the hydraulic circuit for industrial vehicles summarized as follows, and by vehicles comprising it. The hydraulic circuit is for the transmissions of industrial and agricultural vehicles of the type comprising an internal combustion engine, a hydraulic transmission connected to the hydraulic circuit, a hydraulically operated auxiliary unit, and an output shaft driven by the internal combustion engine which is capable of providing a useful power to drive other working components. The circuit includes (a) a feed pump operating on a working fluid of the hydraulic circuit and connected to the internal combustion engine of the vehicle in order to be driven; (b) a delivery section connected to a hydraulic transmission of the vehicle, the transmission having a lubrication circuit and/or a torque converter of the vehicle; (c) an auxiliary uses section connected to the hydraulically operated auxiliary unit for providing the working fluid at a working pressure to the hydraulically operated auxiliary unit; (d) a main pressure regulator adapted to bring about a first variation in pressure in an operating fluid in the circuit through an inlet section connected to the pump and an outlet section connected to the delivery section; (e) a first regulating section connecting the main pressure regulator to a switching device and to which a first regulating pressure is associated, the switching device adapted to alternately open or close a connecting branch to the regulating section in such a way as to modify the first regulating pressure and regulate a first pressure variation; (f) a maximum pressure regulator connected to the delivery section which can bring about a second pressure variation in the operating fluid between the outlet section and a discharge section, wherein the auxiliary uses section and the delivery section are positioned respectively upstream and downstream of the main pressure regulator.

This invention has a number of significant advantages. A main advantage lies in the fact that it can reduce the energy wastage which takes place during the stage when an earthmoving machine is purely excavating and in general when industrial vehicles are only engaged in working. In addition to this the hydraulic circuit according to this invention is simple from the point of view of construction and has a minimum effect on the overall cost of the vehicle.

It is to be understood that both the foregoing general description and the following detailed description are exemplary, but are not restrictive, of the invention. Other advantages, characteristics and methods of use of this invention will be apparent from the following detailed description of some embodiments provided by way of example and without limitation.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Reference will be made to the figures in the appended drawing in which.

DETAILED DESCRIPTION OF THE INVENTION

Figure 1:
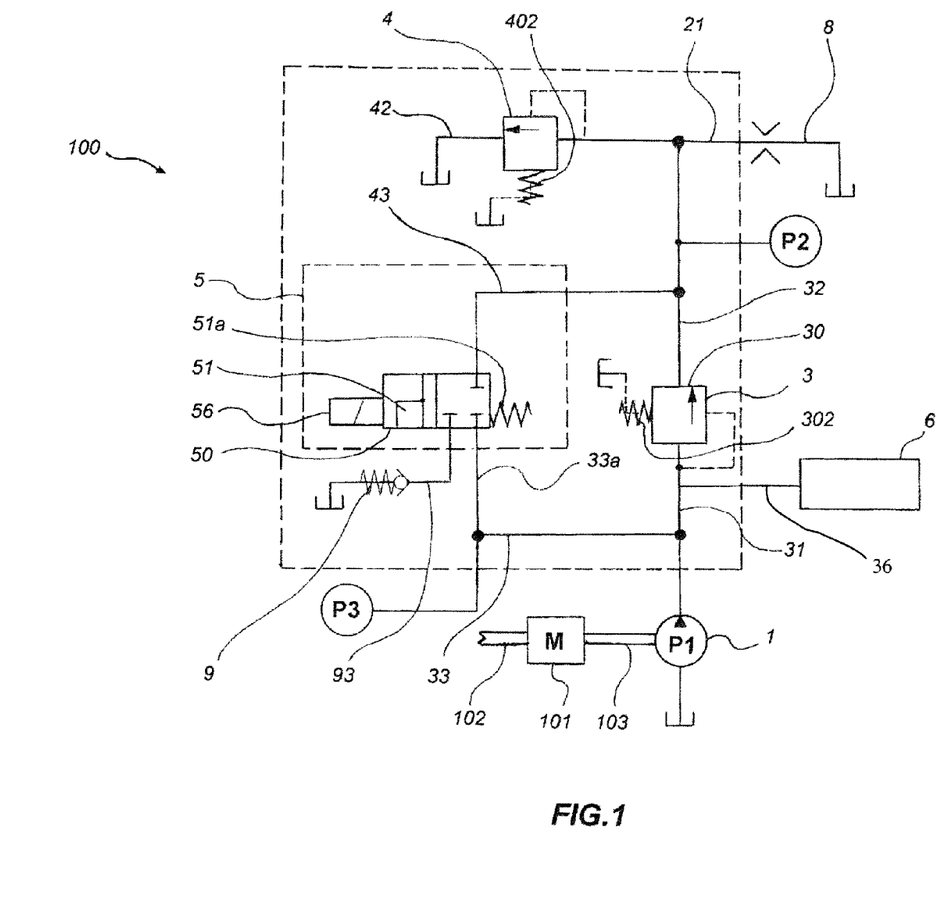
FIG. 1 is a diagrammatical illustration of the hydraulic circuit according to an exemplary embodiment of this invention.

With reference initially to FIG. 1, a hydraulic circuit for the transmissions of industrial and agricultural vehicles, such as for example an earthmoving machine, is indicated as a whole by reference number 100.

As will be more apparent below, this hydraulic circuit 100 is intended to be used in vehicles of the type comprising an internal combustion engine 101 connected to the hydraulic circuit 100 and an output shaft 102 driven by the internal combustion engine 101 forming a power take-off (PTO) to provide working power to working components of the vehicle, which are not shown in the figure.

These working components may be represented by a moving arm on which excavation mechanisms are supported or by other working mechanisms or services which receive power from output shaft 102.

Hydraulic circuit 100 comprises a feed pump 1 which operates on a working fluid for the circuit, typically oil, in order to raise it to a main working pressure p1.

Feed pump 1 is driven by internal combustion engine 101 and is in particular connected, for example through a key, to a transmission shaft 103 of a transmission unit, which is not shown in the figure, which is in turn connected to engine 101. As a consequence, a change in the rotation speed of the engine will result in a change in the power transmitted to both pump 1 and the working components via the power take-off.

Figure 5:
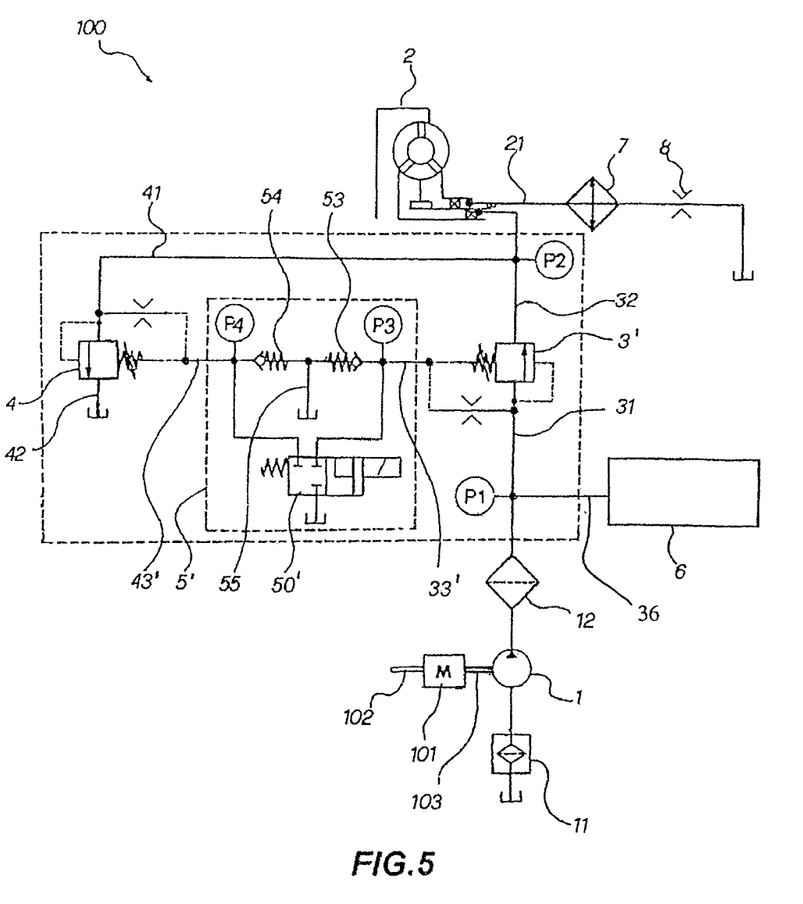
FIG. 5 is a diagrammatical illustration of the hydraulic circuit according to this invention according to a further embodiment.

The hydraulic circuit 100 may also comprise an inlet filter 11 and a delivery filter 12, illustrated in FIG. 5, upstream and downstream from pump 1, respectively.

With reference again to FIG. 1, the working fluid leaving pump 1 is intended to provide operative fluid at working pressure p1 to a hydraulically operated auxiliary unit 6, such as the arm of a backhoe, via an auxiliary uses section 36. The working fluid provides the lubrication necessary for the transmission components via a delivery section 21 which delivers fluid to a heat exchanger 7 and a lubricating circuit 8, and which may also be intended for a torque converter 2, which is only illustrated in connection with the embodiment of FIGS. 5 to 7. More generally, the delivery section 21 is connected to a hydraulic transmission providing power to the wheels or tracks of the vehicle for moving it.

The throughput of the working fluid delivered to lubricating circuit 8 and, if present, to torque converter 2 may have a pre-set pressure, indicated below as the secondary working pressure p2, and as a consequence the pressure between the output of the pump 1 and the input to the torque converter 2 must be regulated.

For this purpose the hydraulic circuit 100 according to this invention comprises a main pressure regulator 3 in correspondence of which a first change in pressure Δp1 in the working fluid occurs.

The working fluid delivered by pump 1 to main pressure regulator 3 through an inlet section 31 at a main working pressure p1 is delivered by main pressure regulator 3 to lubricating circuit 8 and/or torque converter 2 through an outlet section 32 at the working pressure p2 of torque converter 2 which is lower than pressure p1.

For this purpose, main pressure regulator 3, which is illustrated diagrammatically in the figures, comprises a valve body 30 within which there is housed a moving plug which moves in an axial direction depending upon the pressure of the working fluid, opposed by a resilient member 302.

In other words, ignoring load losses, pressure p1 will be regulated by resilient member 302.

It should be also noted that the working fluid operated by the pump 1 is also delivered at a working pressure to the hydraulically operated auxiliary unit 6 via auxiliary uses section 36 which is positioned upstream from main pressure regulator 3 and, in the present embodiment, connected to the inlet section 31.

By contrast, delivery section 21 is positioned downstream from main pressure regulator 3.

Hydraulic circuit 100 according to this invention further comprises a second pressure regulator 4 connected to outlet section 32 in order to regulate the pressure p2 fed to torque converter 2 and/or lubricating circuit 8. This second pressure regulator 4 preferably has characteristics similar to main pressure regulator 3 and is connected to a discharge branch 42 in such a way as to regulate pressure p2 on the basis of a corresponding resilient member 402. The change in pressure $\Delta p1$ between pressure p1 and pressure p2 is therefore defined on the basis of the pressure regulation brought about by resilient members 302 and 402.

In order to change the manner in which the hydraulic circuit 100 operates, the circuit according to this invention makes it possible to regulate the pressure change $\Delta p1$ between inlet and outlet sections 31 and 32.

In particular, in this embodiment, regulation of pressure change $\Delta p1$ takes place by bypassing main pressure regulator 3.

For this purpose a flow of working fluid is intercepted by a regulating or by-pass section 33 which transmits the working fluid originating from pump 1 to a switching device 5 through a connecting branch 33a.

According to a first embodiment, switching device 5 takes the form of a switching valve 50 and comprises a moving slide 51, movement of which in a corresponding valve body and in connection with a resilient member 51a switches operation of switching valve 50 between a first and a second operating condition. Movement of slide 51 is brought about by a suitable operating valve 56 which in this embodiment takes the form of a solenoid system of the ON/OFF type.

In the first working condition connecting branch 33a is closed and as a consequence the flow of working fluid coming from pump 31 all passes through main pressure regulator 3. This operating condition, illustrated in FIGS. 1 and 2, will be referred to below as a closed operating condition, and switching valve 50 will be indicated in the closed position.

Figure 2:
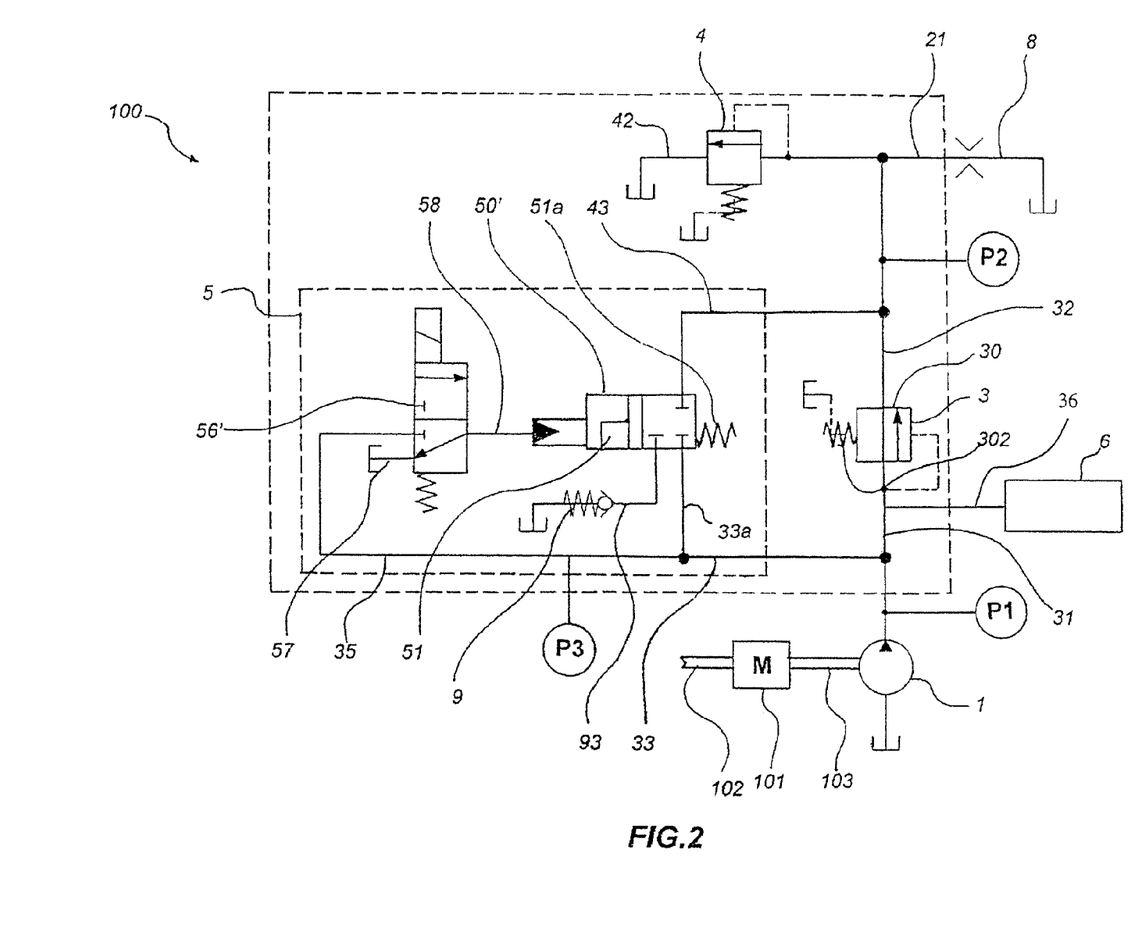
FIG. 2 is a diagrammatical illustration of a second embodiment of the hydraulic circuit according to this invention.

In the closed operating condition pressure p1 is regulated by main pressure regulator 3 and in particular by the calibration of resilient member 302, while pressure p2 is regulated through second pressure regulator 4 through the calibration of corresponding resilient member 402.

Again with reference to FIG. 1, switching valve 50 is also connected to a second regulating section 43 connected to outlet section 32 and a third regulating section 93, which is connected to a pressure limiting valve 9, constructed in such a way as to open when fed by a flow of fluid which respectively meets a pre-set pressure p9 which is less than the main regulating pressure of main pressure regulator 3. Limiting valve 9 is also constructed in such a way that once open after the aforesaid pressure has been exceeded it will discharge fluid through a further discharge section.

Thus, in the open position, regulating sections 33, 43, and 93 are in communication via slide 51.

In particular the bore of connecting branch 33a will make it possible to reduce the pressure difference between p1 and p2, in this case making it substantially equal to zero, and as a consequence it will be possible to maintain a sufficiently high pressure p2 for lubricating circuit 8 with a low working pressure for pump 1.

As a consequence the power P at which pump 1 operates can advantageously be regulated independently of the rotation speed of the engine 101, and therefore of the throughput delivered by the pump 1.

This regulation will however be independent of the regulation of pressure p2 in such a way that it is possible to maintain the minimum pressure required to lubricate the transmission even when the vehicle is stopped.

Regulation of pressure difference $\Delta p1$ is in fact associated with the value of the pressure p3 in regulating section 33, which varies according to the position of switching valve 50.

According to a preferred embodiment illustrated in FIG. 2, the drive unit comprises a three-way and two-position operating valve 56' activated by a solenoid.

Operating valve 56' may selectively deliver a flow of working fluid taken from inlet section 31 towards slide 51 of switching valve 50 in such a way as to make use of hydraulic circuit 100 itself to move slide 51 and achieve the open operating condition.

The flow of operating fluid is delivered to operating valve 56 through a feed section 35 connected to regulating section 33 which is closed in the closed operating position.

When the solenoid is excited operating valve 56 places feed section 35 in connection with slide 51 via section 58 opening switching valve 50. Operating valve 56 is in connection with, and when open discharges fluid through, a discharge section 57.

Figure 3A:
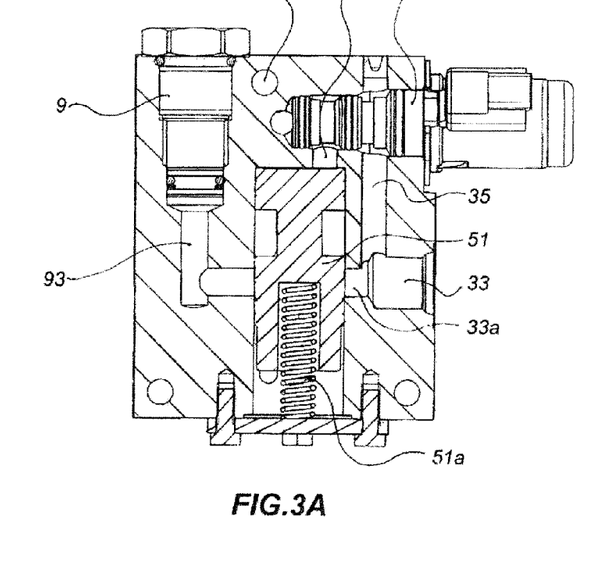
FIGS. 3A and 3B are two cross-sectional views of a switching device and a corresponding drive unit, details of the circuit in FIG. 2, according to a first operating condition in which the circuit operates at a first pressure level.
Figure 3B:
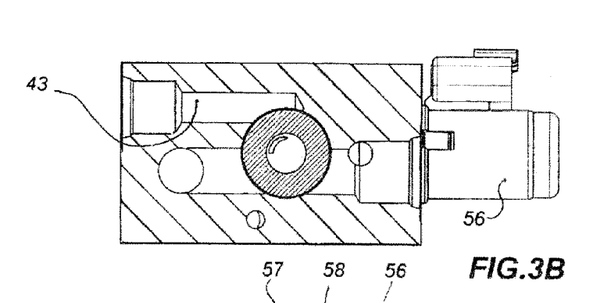
Figure 4A:
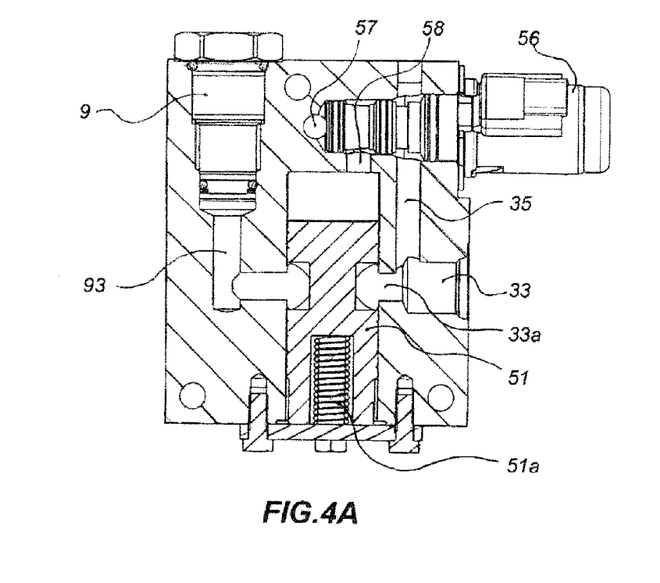
FIGS. 4A and 4B are two cross-sectional views of the switching device and the corresponding drive unit in FIGS. 3A and 3B according to a second operating condition in which the circuit operates at a second pressure level which is lower than the former.
Figure 4B:
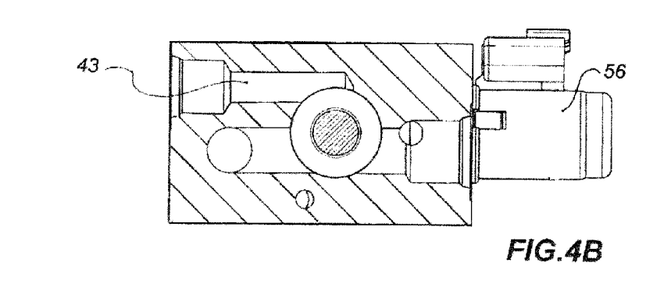

Switching valve 50 and operating valve 56 are shown in the first operating condition in FIGS. 3A and 3B and in the second operating condition in FIGS. 4A and 4B.

It should be noted that this embodiment, although structurally more complex and bulky than the previous, makes it possible to use two cheaper components, advantageously making use of the pressure of pump 1 to operate switching valve 50.

With reference now to FIG. 5, this illustrates a further embodiment of hydraulic circuit 100 for the transmissions of industrial and agricultural vehicles according to this invention.

Again in this embodiment, as illustrated in detail in FIGS. 2 and 3, a main pressure regulator 3' comprises a valve body 30 within which there is housed moving plug 301 which moves in an axial direction according to the pressure of the operating fluid, opposed by resilient member 302.

In this case, however, valve body 30 also comprises an outlet opening 303 which is open when the pressure acting on plug 301 reaches a predetermined level. In addition, provision is also made for an overflow channel 304 which makes it possible also to provide a flow of fluid to the opposite face of plug 301 with respect to that on which the main pressure acts. This flow of fluid will give rise to pressure p3 which opposes movement of plug 301 together with resilient member 302 and therefore the pressure at which outlet opening 303 will open, and consequently the pressure at which fluid will flow out from main pressure regulator 3' will also be determined by the pressure p4 which is therefore referred to as the first regulating pressure.

In other words, ignoring load losses, pressure p1 will be equal to the sum of the pressure determined by resilient member 302 and regulating pressure p3.

With reference again to FIG. 5, in order to regulate pressure p2, hydraulic circuit 100 according to this embodiment will comprise a maximum pressure regulator 4'.

Maximum pressure regulator 4' has characteristics similar to pressure regulator 3' and therefore also comprises a valve body 40 in which a movable closure member or moving plug 401 can move in an axial direction in order to open an outlet opening 403. Again, in this case movement of plug 401 is opposed by resilient member 402 and regulating pressure p4 of an overflow flow provided by a channel 404.

In regulator 4' plug 401 will be operated through pressure p2 via a section 41 of hydraulic circuit 100 connected to outlet section 32 of regulator 3', while outlet opening 403 is connected to discharge branch 42, preferably at constant pressure.

In this way it will be possible to regulate pressure p2 on the basis of a second pressure change which can therefore be regulated via regulating pressure p4.

In fact, in a similar way to regulator 3', pressure p2 will be defined as the sum of the pressure determined by resilient member 402 and regulating pressure p4.

In this embodiment, a switching device 5' is advantageously able to regulate regulating pressures p3 and p4.

It must in fact be noted that on the basis of the configuration described above regulation of pressures p3 and p4 makes it possible to regulate pressures p2 and p1 depending upon the working condition required.

In particular, by lowering pressures p3 and p4 it is possible to obtain a consequent respective reduction in pressure p2 and pressure p1.

Switching device 5' is connected by corresponding regulating sections 33', 43' to pressure regulators 3 and 4, and they comprise pilot valves 53, 54.

Pilot valves 53 and 54 are such that they open when they are provided with a flow of fluid which meets pressures p3 and p4, respectively, and once open discharge fluid through a further discharge section 55.

Regulating sections 33' and 43' are also connected to a switching valve 50', preferably of the solenoid On/Off type, with characteristics similar to switching valve 50 previously described.

Figure 6:
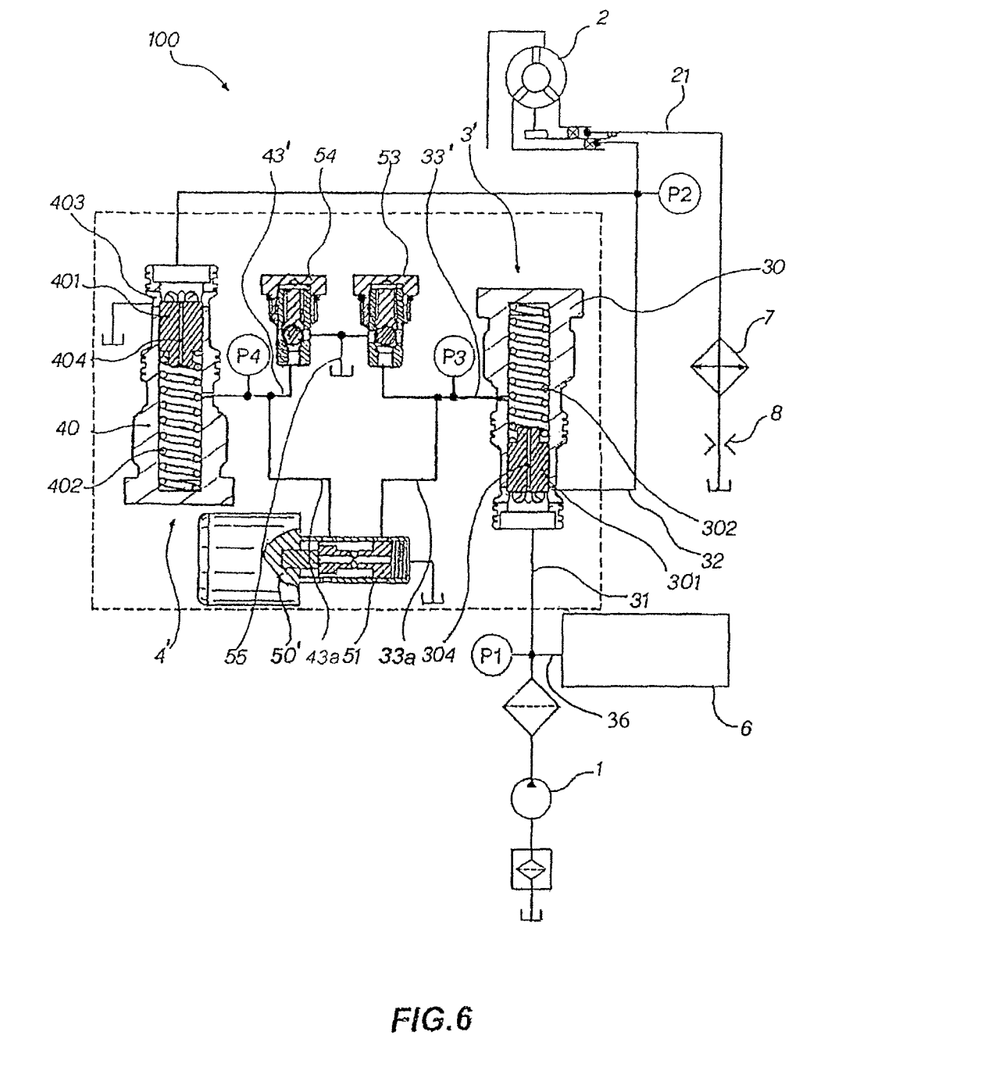
FIG. 6 is a diagrammatical illustration of the hydraulic circuit in FIG. 5 in accordance with a first operating condition in which the circuit operates at a first pressure level.

In a first position illustrated in FIG. 6, switching valve 50' closes off connecting branches 33a and 43a from regulating sections 33' and 43' through the action of moving slide 51 in such a way that the flow of working fluid which is drawn off in pressure regulators 3' and 4' is wholly delivered to pilot valves 53 and 54.

Figure 7:
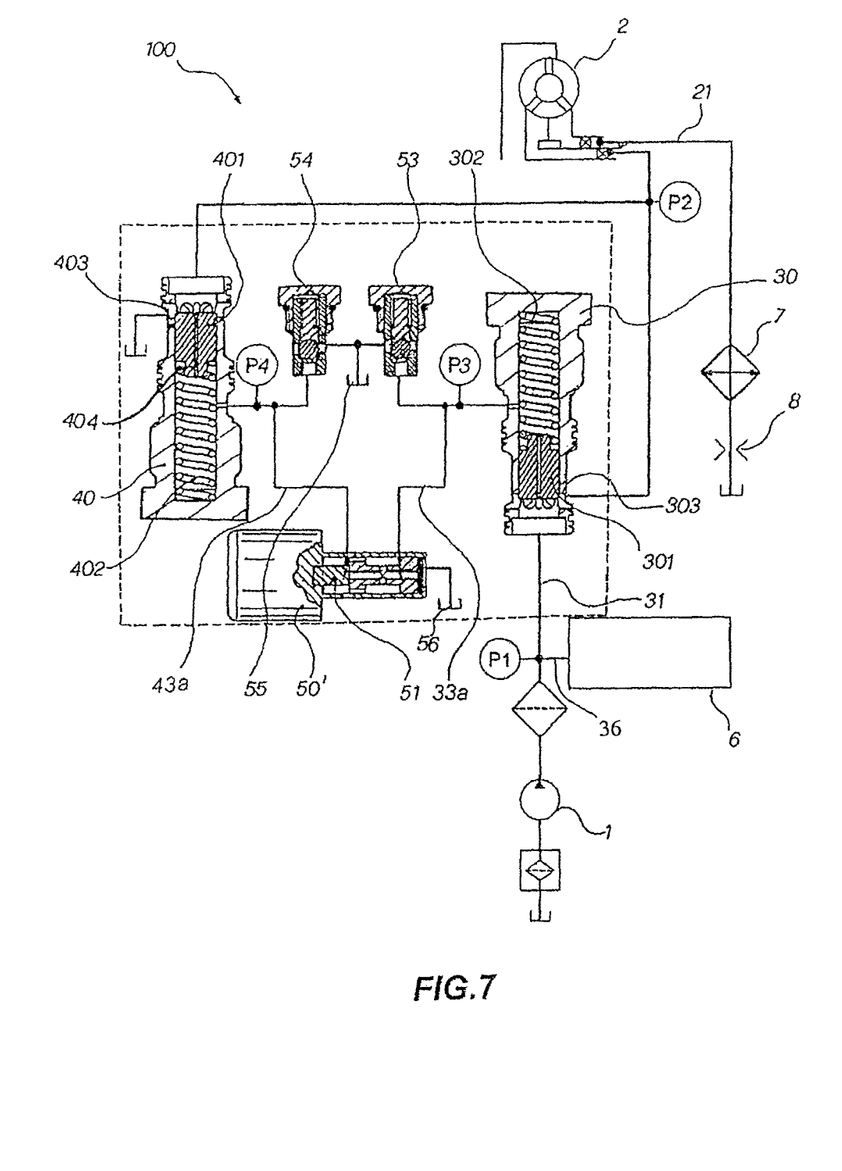
FIG. 7 is a diagrammatical illustration of the hydraulic circuit in FIG. 5 according to a second operating condition in which the circuit operates at a second pressure level which is lower than the former.

In the second position illustrated in FIG. 7, moving slide 51 is arranged in such a way that it allows working fluid to pass into branches 33a and 43a as far as discharge section 55 in such a way that regulating pressures p3 and p4 are equal to the discharge pressure, neglecting load losses, specifically equal to ambient pressure.

Thus pressures p1 and p2 will be defined by the opposing action of resilient members 302 and 402. As a consequence the power P at which pump 1 operates may advantageously be regulated independently of the rotation speed of engine 101, and therefore the flow delivered by pump 1.

This regulation will however be independent of the regulation of pressure p2, in such a way that it is possible to maintain the minimum pressure required for lubricating the transmission even when the vehicle is stopped.

Therefore, hydraulic circuit 100 as described makes it possible to overcome the problems identified with reference to this invention, thanks to the possibility of operating at two different pressure levels.

In this way it will in fact be possible to reduce the power wasted when the vehicle is stopped and in general when there is no need to drive the hydraulic transmission.

Furthermore hydraulic circuit 100 uses particularly economical components and will not give rise to high costs in comparison with known circuits.

The invention claimed is:

1. A hydraulic circuit for the transmissions of industrial and agricultural vehicles of the type comprising an internal combustion engine, a hydraulic transmission connected to the hydraulic circuit, a hydraulically operated auxiliary unit and an output shaft driven by the internal combustion engine which is adapted to provide power to drive other working components, the circuit comprising:

a. a feed pump operating on a working fluid of the hydraulic circuit and connected to the internal combustion engine of the vehicle in order to be driven;
   b. a delivery section connected to a hydraulic transmission of the vehicle, the transmission having one or both of a lubrication circuit and a torque converter of the vehicle;
   c. an auxiliary uses section connected to the hydraulically operated auxiliary unit for providing the working fluid at a working pressure to the hydraulically operated auxiliary unit;
   d. a main pressure regulator adapted to create a first variation in pressure in an operating fluid in the circuit through an inlet section connected to the pump and an outlet section connected to the delivery section;
   e. a first regulating section connecting the main pressure regulator to a switching device and to which a first regulating pressure is associated, the switching device adapted to alternately open or close a connecting branch to the regulating section in such a way as to modify the first regulating pressure and regulate the first variation in pressure; and
   f. a maximum pressure regulator connected to the delivery section for creating a second pressure variation in the operating fluid between the outlet section and a discharge section;

wherein the auxiliary uses section and the delivery section are positioned respectively upstream and downstream of the main pressure regulator and wherein the switching device comprises a switching valve which selectively closes off the regulating section and places it in connection with a second regulating section connected to the outlet section and a third regulating section connected to a pressure limiting valve, respectively.

2. The hydraulic circuit according to claim 1, in which the torque converter is connected to the outlet section.

3. The hydraulic circuit according to claim 1, in which the switching device comprises a moving slide, the connecting branch being closed off by being intercepted by the moving slide, this moving slide being moved by a flow of operating fluid.

4. The hydraulic circuit according to claim 1, in which the switching device comprises a moving slide, the connecting branch being closed off by being intercepted by the moving slide, this moving slide being moved by a flow of operating fluid.

5. A hydraulic circuit for the transmissions of industrial and agricultural vehicles of the type comprising an internal combustion engine, a hydraulic transmission connected to the hydraulic circuit, a hydraulically operated auxiliary unit and an output shaft driven by the internal combustion engine which is adapted to provide power to drive other working components, the circuit comprising:

a. a feed pump operating on a working fluid of the hydraulic circuit and connected to the internal combustion engine of the vehicle in order to be driven;
   b. a delivery section connected to a hydraulic transmission of the vehicle, the transmission having one or both of a lubrication circuit and a torque converter of the vehicle;
   c. an auxiliary uses section connected to the hydraulically operated auxiliary unit for providing the working fluid at a working pressure to the hydraulically operated auxiliary unit;
   d. a main pressure regulator adapted to create a first variation in pressure in an operating fluid in the circuit through an inlet section connected to the pump and an outlet section connected the delivery section;

e. a first regulating section connecting the main pressure regulator to a switching device and to which a first regulating pressure is associated, the switching device adapted to alternately opening or close a connecting branch to the regulating section in such a way as to modify the first regulating pressure and regulate the first variation in pressure; and f. a maximum pressure regulator connected to the delivery section for creating a second pressure variation in the operating fluid between the outlet section and a first discharge section;

wherein the auxiliary uses section and the delivery section are positioned respectively upstream and downstream of the main pressure regulator and wherein the second pressure variation is regulated in relation to a second regulating pressure provided through a second regulating section and wherein the switching device comprises pilot valves connected to the first and second regulating sections, respectively, and a switching valve adapted to be switched between operating positions, a first position in which the operating fluid in the first and second regulating sections is all passed to the pilot valves and a second in which at least one portion of the operating fluid flow is passed to a second discharge section.

6. The hydraulic circuit according to claim 5, in which the main pressure regulator and the maximum pressure regulator each comprise a valve body, a movable closure member, a resilient member, and a bleed channel through which a fraction of the operating fluid flow is passed.

7. The hydraulic circuit according to claim 6, in which a main working pressure at which the pump operates acts on one side of the movable closure member of the main pressure regulator and a maximum operating pressure acts on a face of the movable closure member of the maximum pressure regulator.

8. The hydraulic circuit according to claim 7, in which the main operating pressure is opposed by the resilient member of the main pressure regulator and the first regulating pressure, and the maximum operating pressure is opposed by the resilient member of the maximum pressure regulator and the second regulating pressure.

9. The hydraulic circuit according to claim 5, wherein the torque converter is connected to the outlet section.

10. The hydraulic circuit according to claim 5, in which the main pressure regulator and the maximum pressure regulator each comprise a valve body, a movable closure member, a resilient member, and a bleed channel through which a fraction of the operating fluid flow is passed.

11. The hydraulic circuit according to claim 10, in which a main working pressure at which the pump operates acts on one side of the movable closure member of the main pressure regulator and a maximum operating pressure acts on a face of the movable closure member of the maximum pressure regulator.

12. The hydraulic circuit according to claim 11, in which the main operating pressure is opposed by the resilient member of the main pressure regulator and the first regulating pressure, and the maximum operating pressure is opposed by the resilient member of the maximum pressure regulator and the second regulating pressure.

13. An agricultural or industrial vehicle comprising:
an internal combustion engine;
an output shaft driven by the internal combustion engine and adapted to provide power to drive further working components;
a hydraulic transmission for moving the vehicle;
a hydraulically operated auxiliary unit; and
a hydraulic circuit including:
  a. a feed pump operating on a working fluid of the hydraulic circuit and being connected to and driven by the internal combustion engine,
  b. a delivery section connected to the hydraulic transmission, the transmission having a lubrication circuit, a torque converter, or both,
  c. an auxiliary uses section connected to the hydraulically operated auxiliary unit for providing the working fluid at a working pressure to the hydraulically operated auxiliary unit,
  d. a main pressure regulator adapted to create a first variation in pressure in an operating fluid in the circuit through an inlet section connected to the pump and an outlet section connected to the delivery section,
  e. a first regulating section connecting the main pressure regulator to a switching device and to which a first regulating pressure is associated, the switching device adapted to alternately open or close a connecting branch to the regulating section in such a way as to modify the first regulating pressure and regulate the first variation in pressure, and
  f. a maximum pressure regulator connected to the delivery section for creating a second pressure variation in the operating fluid between the outlet section and a discharge section;
wherein the auxiliary uses section and the delivery section are positioned respectively upstream and downstream of the main pressure regulator and wherein the switching device comprises a switching valve which selectively closes off the regulating section and places it in connection with a second regulating section connected to the outlet section and a third regulating section connected to a pressure limiting valve, respectively.

14. The vehicle according to claim 13, in which the switching device comprises a moving slide, the connecting branch being closed off by being intercepted by the moving slide, this moving slide being moved by a flow of operating fluid.

15. An agricultural or industrial vehicle comprising:
an internal combustion engine;
an output shaft driven by the internal combustion engine and adapted to provide power to drive further working components;
a hydraulic transmission for moving the vehicle;
a hydraulically operated auxiliary unit; and
a hydraulic circuit including:
  a. a feed pump operating on a working fluid of the hydraulic circuit and being connected to and driven by the internal combustion engine,
  b. a delivery section connected to the hydraulic transmission, the transmission having a lubrication circuit, a torque converter, or both,
  c. an auxiliary uses section connected to the hydraulically operated auxiliary unit for providing the working fluid at a working pressure to the hydraulically operated auxiliary unit,
  d. a main pressure regulator adapted to create a first variation in pressure in an operating fluid in the circuit through an inlet section connected to the pump and an outlet section connected to the delivery section,
  e. a first regulating section connecting the main pressure regulator to a switching device and to which a first regulating pressure is associated, the switching device adapted to alternately open or close a connecting branch to the regulating section in such a way as to modify the first regulating pressure and regulate the first variation in pressure, and f. a maximum pressure regulator connected to the delivery section for creating a second pressure variation in the operating fluid between the outlet section and a first discharge section, wherein the auxiliary uses section and the delivery section are positioned respectively upstream and downstream of the main pressure regulator, and the second pressure variation is regulated in relation to a second regulating pressure provided through a second regulating section, and the switching device comprises pilot valves connected to the first and second regulating sections, respectively, and a switching valve adapted to be switched between operating positions, a first position in which the operating fluid in the first and second regulating sections is all passed to the pilot valves and a second in which at least one portion of the operating fluid flow is passed to a second discharge section.

16. The vehicle according to claim 15, in which the main pressure regulator and the maximum pressure regulator each comprise a valve body, a movable closure member, a resilient member, and a bleed channel through which a fraction of the operating fluid flow is passed.

17. The vehicle according to claim 16, in which a main working pressure at which the pump operates acts on one side of the movable closure member of the main pressure regulator and a maximum operating pressure acts on a face of the movable closure member of the maximum pressure regulator; the main operating pressure is opposed by the resilient member of the main pressure regulator and the first regulating pressure; and the maximum operating pressure is opposed by the resilient member of the maximum pressure regulator and the second regulating pressure.

* * * * *